United States Patent [19]

Blank

[11] 3,945,961
[45] Mar. 23, 1976

[54] NOVEL CROSS-LINKING AGENTS AND THEIR USE IN ELECTROPHORETIC COATING COMPOSITION
[75] Inventor: Werner Josef Blank, Wilton, Conn.
[73] Assignee: American Cyanamid Company, Stamford, Conn.
[22] Filed: Jan. 23, 1975
[21] Appl. No.: 543,396

Related U.S. Application Data
[60] Division of Ser. No. 418,139, Nov. 21, 1973, Pat. No. 3,894,993, which is a continuation of Ser. No. 302,957, Nov. 1, 1972, abandoned, which is a continuation of Ser. No. 130,531, April 1, 1971, abandoned.

[52] U.S. Cl. .... 260/29.4 UA; 260/29.4 R; 260/849; 260/850
[51] Int. Cl.$^2$ .......................................... C08L 61/20
[58] Field of Search .............. 260/29.4, 260/29.4 R, 260/29.4 UA:849, 850

[56] References Cited
UNITED STATES PATENTS

| | | |
|---|---|---|
| 3,635,867 | 1/1972 | Yuille .......................... 260/29.4 UA |
| 3,647,520 | 3/1972 | Gor et al. ..................... 260/29.4 UA |
| 3,650,998 | 3/1972 | Sekmakas et al. ........... 260/29.4 UA |

Primary Examiner—Murray Tillman
Assistant Examiner—J. Ziegler
Attorney, Agent, or Firm—James T. Dunn

[57] ABSTRACT

This disclosure relates to certain cross-linking agents comprising condensation products prepared by heat reacting certain substantially water-insoluble, substantially fully etherified, substantially fully methylolated guanamines, or substantially fully etherified, substantially fully methylolated melamine compounds with certain alkylated phenolic compounds. The disclosure also relates to a composition for electrocoating metals comprising an aqueous dispersion of a mixture of certain resinous reaction products of certain guanamine or malamine derivatives that have been reacted with certain hydroxy alkylated phenolic compounds blended with certain water-dispersible, non-gelled polymeric materials carrying an anionic charge which polymeric materials are heat reactive with said resinous reaction products.

7 Claims, No Drawings

3,945,961

NOVEL CROSS-LINKING AGENTS AND THEIR USE IN ELECTROPHORETIC COATING COMPOSITION

CROSS-REFERENCES TO RELATED APPLICATIONS

This application is a division of application Ser. No. 418,139, filed Nov. 21, 1973, now U.S. Pat. No. 3,894,993, which application in turn was a continuation of my earlier application having the United States S.N. 302,957 filed November 1, 1972, now abandoned, which application in turn was a continuation of my earlier application having the United States S.N. 130,531 filed on April 1, 1971, now abandoned.

BACKGROUND OF THE INVENTION

In the past, the most frequently used methods in painting metallic articles having irregularly shaped surfaces have included hand or automatic spray painting, electrostatic painting, brushing, or dipping. Electrophoretic techniques have been utilized in coating articles having a relatively small surface area, but these techniques have been restricted to the application of special coating materials. The present methods of applying a surface coating on large metallic articles have resulted in the waste of relatively large amounts of the coating due to overspraying or due to the accumulation of excess paint material along certain surfaces of the coated articles. Additionally, these coating techniques have usually resulted in a relatively poor surface finish to the article being coated due to uneven distribution of paint or due to surface blemishes. Additionally, prior methods for applying a coating onto comparatively large metal articles has been the fact that it is rather difficult to obtain a relatively uniform film of paint over the entire surface of the metal articles. Also, generally many of the metal surfaces are not readily accessible to the application of the coating material which results in an unsatisfactory or spotty coating. Recessed areas such as the rocker panels of automobiles have only been coated by the prior art techniques at considerable expense because of the requirements of special coating techniques or special hand labor operations in order to obtain at least a minimum measure of protective coating against corrosion. The technique of dipping the metallic article in a paint bath to obtain a coating on recessed surfaces of a metallic article has not proven satisfactory since the evaporation of solvents from the paint film has resulted in the washing off of a portion of the adhered paint coating.

It has been found that a resinous reaction product of a substantially water-insoluble, substantially fully etherified tetramethylol guanamine or a substantially fully etherified hexamethylol melamine reacted with a hydroxy alkylated phenol can be used as a cross-linking agent in an aqueous dispersion of a mixture of said resinous reaction product with a water-dispersible, non-gelled polymeric material carrying an anionic charge, namely, either cationic or anionic charges, which polymeric material is heat reactive with said cross-linking agent, namely the resinous hydroxyl alkylated phenol modified etherified tetramethylol guanamine or hexamethylol melamine compound and such dispersions can be applied to metals by use of an electrodeposition technique.

FIELD OF THE INVENTION

This invention is in the field of electrodeposition of coating compositions on conductive metal surfaces in which cross-linking agents are used in order to convert a thermosetting composition to the thermoset state by the application of heat. The particular cross-linking agents are used in the present invention are the novel resinous reaction products of substantially water-insoluble, substantially fully etherified tetramethylol guanamines, with certain hydroxy alkylated phenols or the resinous reaction product of substantially fully etherified hexamethylol melamines with a hydroxy alkylated phenol. These cross-linking agents are used with certain water-dispersible, non-gelled polymeric materials carrying an ionic charge namely either cationic or anionic charges which polymeric materials are heat reactive with the resinous cross-linking agents of the present invention.

DESCRIPTION OF THE PRIOR ART

Attention is directed to the U.S. Pat. Nos. 3,449,228 and 3,502,557. In the former U.S. patent there is disclosed the reaction of certain amino aldehyde condensation products and a phenol compound or a polyol compound. Unfortunately, the latter reaction will yield good alkali and detergent resistant products, but the resultant coated films discolor badly during the baking or curing process. Similarly, the use of a polyol yields good colour during baking, but poor alkali resistance. In the U.S. Pat. No. 3,502,557, there is shown a reaction of an amino aldehyde condensation product with a hydroxy-containing carboxylic acid product. Acids with phenolic hydroxy groups disclosed therein again discolor badly during the curing or baking of the finished coated product.

Reference is also made to the U.S. Pat. No. 3,471,388 and to the literature article entitled "Electrodeposition: Theory and Practice," by Glover et al. in the Official Digest, February 1965, pages 113-128, inclusive. Attention is also directed to the British Pat. No. 933,175 published on Aug. 8, 1963, entitled "Improvements in an Electrophoretic Coating Process." The following additional references were used in the instant applicant's earlier application: U.S. Pat. Nos. 3,502,557, 3,635,867 and 3,661,819. Each of these patents and literature references are incorporated herein by reference.

SUMMARY OF THE INVENTION

This invention relates to certain movel cross-linking agents comprising the heat reaction product of from about 90% to about 30% of a substantially water-insoluble, substantially fully etherified, substantially fully methylolated guanamine or substantially fully etherified, substantially fully methylolated melamine and from about 10% to about 70% of an alkylated phenolic compound having the formula:

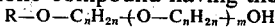

wherein R is an aryl radical, $m$ is an integer from 0 to 3, and $n$ is an integer from 2 to 4. This invention also relates to the use of these novel cross-linking agents in certain electrodeposition coating compositions. These electrodeposition coating compositions can be used effectively in the coating of metallic articles by use of an electrophoretic technique which will provide a substantially uniform coating on all surfaces being treated. Furthermore, the novel electrodeposition compositions of the present invention can be heat cured to the thermoset state by virtue of the presence of the novel crosslinking agents. The coating are resistant to color changes, are resistant to detergent attack and also exhibit an excellent resistance to salt sprays, a problem which has been plaguing the automotive industry for years.

In the electrodeposition compositions of the present invention, there is blended a resinous phenolic compound modified alkylated, substantially water-insoluble, substantially fully etherified tetramethylol guanamines or hexamethylol melamines, and a water dispersible, non-gelled polymeric material carrying an ionic charge which is heat reactive with said guanamine or melamine compounds. The two principal components are blended in an aqueous solvent. This dispersion medium may consist of water alone or may contain additional solvents but, generally, water should be the preponderant member of the dispersion medium and, for economic reasons, the other possible solvents that could be used with water are omitted unless they are designed to serve some special function.

The first component is a resinous reaction product of from about 10% to about 70% of certain hydroxy alkylated phenols and correspondingly from about 90% to about 30% of a water-insoluble, substantially fully etherified polymethylol guanamine or substantially fully etherified hexamethylol melamine, said product being produced by a transetherification process in the presence of hydrogen ion derived from any acid source at an elevated temperature which process is more fully described hereinbelow.

The guanamine or melamine reactant may be represented by the formula:

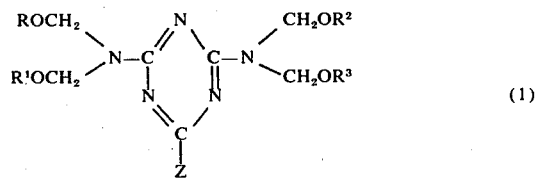

(1)

wherein R, $R^1$, $R^2$ and $R^3$ are the same or different alkyl radicals of 1–8 carbon atoms, inclusive, and Z is hydrogen, an alkyl radical of 1–8 carbon atoms, inclusive, an aryl radical, or the radical:

and wherein $R^4$ and $R^5$ are the same or different alkyl radicals of from 1 to 8 carbon atoms. Exemplary of the latter are: di(methoxymethyl)di(ethoxymethyl)benzoguanamine, tetra(methoxymethyl)-methyl guanamine, di(butoxymethyl)tetra(ethoxymethyl)melamine, hexa(butoxymethyl)melamine, and the like.

The alkylated phenolic reactant useful herein may be represented by the formula:

 (II)

where $R^6$ is an aryl radical, m is 0 to 3 and n is 2 to 4.

Illustrative of the alkylated phenols are: phenoxyethanol, 2-(o-ethylphenoxy)ethanol, 2-(o-nonylphenoxy)ethanol, 2-(p-nonylphenoxy)ethanol, (phenoxydiethoxy)ethanol, 2-(o-octyl phenoxy)ethanol, 3-(p-octylphenoxy)propanol, 4-(o-n-butylphenoxy)butanol, 4-(o-octylphenoxy)butanol, and equivalents thereof.

Where desired, mixtures of such phenols may be used. The alkylated phenolic reactant can be prepared by reacting equimoles of a suitable alkylene oxide and a phenol under conditions well known in the art.

Resinous reaction product, Component A, may thus be prepared by reacting a molar excess of (I) above with (II) above in the presence of an acidic medium in which hydrogen ion is supplied from any suitable source, such as inorganic acids or organic acids, as sulfuric or nitric acid, as p-toluene sulfonic acid or maleic acid for at least two hours at temperatures of at least 100°C. Resultant resinified product is of relatively low molecular weight usually between about 500 and 5,000 and ranges from a highly viscous liquid to a sticky solid.

The amount of the phenol modified resinous, substantially water-insoluble, substantially fully etherified tetramethylol guanamines or phenol modified etherified hexamethylol melamine used in the composition of the present invention will vary between about 5% and about 40%, by weight, based on the total weight of said etherified tetramethylol guanamines or hexamethylol melamines and the ionic, water dispersible, non-gelled polymeric material which is heat reactive with said guanamine compounds mixture. Correspondingly, in the composition, there will be from about 95% to about 60%, by weight, of the ionic, water dispersible, non-gelled polymeric material which is heat reactive with said etherified tetramethylol guanamines or melamines, based on the total weight of said ionic, polymeric material and said mixture of the etherified tetramethylol guanamines or hexamethylol melamines. It should be apparent that all of the above percentages, by weight, will total 100%, by weight, and are based on the total weight of the guanamine or melamine compounds and said ionic, polymeric material. It is preferred to use between about 10% and about 30%, by weight, of the guanamine or melamine compounds and correspondingly from about 90% and 70%, by weight, of the said ionic, polymeric material, same basis.

The process for making a representative resinous, substantially water-insoluble, substantially fully etherified tetramethylol guanamines or substantially fully etherified hexamethylol melamines, is set forth hereinbelow. This example is set forth primarily for the purpose of illustration and no specific enumeration of detail contained therein should be interpreted as a limitation on the claims except as is indicated in the appended claims. All parts are parts, by weight, unless otherwise indicated.

PREPARATION OF A RESINOUS, ALKYLATED PHENOLIC, ETHERS OF TETRAMETHYLOL BENZOGUANAMINE

EXAMPLE 1

To a reactor fitted with a stirrer, thermometer, and condenser were added 400 parts of a di(methoxymethyl)di(ethoxymethyl)benzoguanamine, 260 parts of 2-(o-nonylphenoxy)ethanol and 5 parts of maleic anhydride. The mixture was heated slowly to 125°C. The alcoholic reaction is distilled off at 125°C. Heating was increased to 145°C. and held for 4 hours. After a total reaction time of 7 hours, the contents in the reactor were cooled to room temperature and removed.

Resulting pale yellow resin is characterized as having a viscosity of 990 poises at 25°C. at a solids content of 97.5%.

Alternatively, in the above procedure, the nonylphenoxyethanol recactant employed is a commercial mixture in which the nonyl group is ortho as well as para to the phenolic oxygen. Resultant resin has similar properties as the resin prepared above.

EXAMPLE 2

The procedure in Example 1 is repeated in every material respect except that the 2-(o-nonylphenoxy)ethanol compound is replaced with 140 parts of phenoxyethanol. Resultant resinous product is slightly yellow and a sticky solid.

EXAMPLE 3

In a suitable reaction vessel are blended 640 parts of hexa(butoxymethyl)melamine and 240 parts of 4-(phenoxy)butanol with 5 parts of maleic anhydride and heated to 135°c.–145°C. at about 125°C. n-butanol distills over. Heating is continued until 75 parts of n-butanol have been collected. The finished product has a viscosity of 200 poises at 96.5% solids.

The second component in the electrodeposition compositions of the present invention is a water dispersible, non-gelled, polymeric material carrying an ionic charge, or more precisely, either an anionic or cationic charge. These two classes of ionically charged materials will be discussed hereinbelow.

It will be observed that it is not sufficient for the ionic, water dispersible, non-gelled, polymeric material to be only cationic or anionic. This non-gelled polymeric material must, in addition to the aforementioned charge characteristic, also contain one or more reactive sites selected from the group consisting of carboxyl groups, alcoholic hydroxyl groups and amido groups in order to cross-link with the guanamine or melamine materials used in the present invention. If the non-gelled, polymeric material contains carboxyl groups, it will be anionic but it will be capable of being converted to a cationic material by amination or by use of a cationic surfactant, which material will inherently be carrying with it the cross-linking sites for the guanamine compound. On the other hand, if the non-gelled, polymeric material is devoid of any carboxyl groups, but does contain alcoholic hydroxyl groups and/or amido groups, said polymeric material will be non-ionic but can be converted to an anionic material by carboxylating the polymeric material or by dispersing said polymeric material in water with an anionic surfactant. By the same token, if a non-gelled, water dispersible, polymeric material devoid of any carboxyl groups but containing alcoholic hydroxyl groups and/or amido groups were to be prepared, such material again, as before would contain the necessary cross-linking sites but would, nevertheless be non-ionic polymeric material. If desired, such a non-ionic polymeric material may be converted to a cationic polymeric material by amination of the polymeric material with, for example, a primary or tertiary amine compound, a quaternary ammonium compound and the like or it could be dispersed in water with a cationic surfactant. The purpose for having the electric charge on the water dispersible, non-gelled, polymeric material is so that it will migrate to the anode in an electrophoretic system if an anionic material is present and will migrate toward the cathode if a cationic polymeric material is present. It will be apparent from the illustrative examples of the present invention that these charged polymeric materials move to their respective poles along with the guanamine or melamine materials and become deposited thereon. After the deposition of the mixed polymeric material has been accomplished on the metal, the coated metal is then cured by heat treatment, preferably by baking, in order to accomplish the cross-linking between the guanamine or melamine materials and the polymeric material containing the cross-linking sites that are heat reactive with the guanamine or melamine materials. As used in an electrodeposition process, the bath of the aqueous compositions of the present invention should have a pH varying between about 1 and 11 and, preferably, between about 4 and 9. For the anionic compositions, the pH is controlled between about 6 and 11 and, preferably, between about 7 and 9 whereas that cationic material has a pH between about 1 to 8 and, preferably, between about 4 and 7. Hereinbelow, there is set forth a further discussion of these two classes of polymeric materials, namely, the anionic, water dispersible, non-gelled, polymeric materials which are heat reactive with the guanamine compounds and the cationic, water dispersible, non-gelled, polymeric mateials that are heat reactive with the guanamine compounds.

The anionic, water dispersible, non-gelled, polymeric material used in the electrodeposition composition of the present invention may be any one of the plurality of polymeric materials which have reactive sites that are heat reactive with the etherified guanamine compounds. These reactive sites may be carboxyl groups and/or alcoholic hydroxyl groups and/or amido groups, which polymeric materials are the result of vinyl polymerization, epoxy polymerization etc. or are polyester compositions, or maleinized oils and the like. These polymeric materials may be completely water soluble or they may be substantially water insoluble but capable of being dispersed in water. Sometimes it may be necessary to use appropriate surfactants to disperse these polymeric materials. The term "water dispersible," therefore, is intended to encompass both the aqueous solutions as well as dispersions in which the polymeric material may be suspended in the aqueous medium. These anionic polymeric materials may contain, as the sole reactive sites, carboxyl groups or alcoholic hydroxyl groups or amide groups, or they may, in fact, contain all three.

When polyester resins are used, they can be prepared by reacting a polycarboxylic acid including dicarboxylic acids with a polyhydric alcohol, including the glycols. The polycarboxylic acids may be either saturated, i.e., free of nonbenzenoid unsaturation, or they may be $\alpha,\beta$-ethylenically unsaturated.

If the polyester resins used contain perponderant amounts of the polycarboxylic acid, such polyester should be reacted until an acid number of not less than about 35–40 is reached and, preferably, to an acid number of between about 50-150 . If the polyester resin is prepared by using a preponderance of alcoholic hydroxyl groups, the ingredients forming the polyester should not be permitted to react until a hydroxyl number of not less than about 35–40 is reached and, preferably, between about 50 and 150.

When the anionic polymeric materials are prepared and dispersed in water, they may be rendered alkaline by adjusting the pH to a point above 4 to about 11 and, preferably, to a pH above 7.1 to about 9. This adjustment of the pH is accomplished on the anionic polymeric material before the modified etherified tetramethylol guanamine or melamine compounds are added and then, if necessary, the pH is readjusted to a point within the ranges set forth hereinabove.

The maleinized oils which may be used are water soluble or water dispersible and are generally prepared by reacting unsaturated glyceride oils with an acid or anhydride dienophile such as maleic anhydride. Other aicds or anhydride dienophile have also been used and these include acrylic acid, crotonic acid, and the like. These water solubilized oils were discussed by J. J. Hopwood at the Sixth Australian Convention, Warburton, 16-19, July 1964, and a paper has been published entitled "Water soluble Thermosetting Organic Polymers": in the Journal of the Oil and Colour Chemists Association, February 1965, pages 157–171, inclusive, which reference is incorporated herein by reference.

All of these anionic, water dispersible, non-gelled polymeric materials having carboxyl groups and/or alcoholic hydroxyl groups and/or amide groups have water sensitive sites, obviously, by virtue of the presence of these groups, and these water sensitive sites should all be tied up by interreaction with the etherified tetramethylol guanamine or melamine materials in a cross-linking mechanism.

The anionic, polymeric materials prepared by vinyl polymerization may be prepared in either an aqueous solution, an organic solvent, or in an aqueous emulsion system. All of these procedures are thoroughly well-known in the art and it is not deemed necessary to elaborate on such procedures here.

The vinyl polymers may be prepared by polymerizing polymerizable monomers such as acrylic acid, methacrylic acid, crotonic acid, cinnamic acid, $\beta$-benzoyl acrylic acid, and polycarboxylic acids of the $\alpha, \beta$-ethylenically unsaturated class such as maleic, fumaric, itaconic, mesaconic, aconitic, or the halogenated acids such as halogenated maleic or, more specifically, chloromaleic acid, and the like. These acidic materials may be copolymerized or polymerized with other monomers which contain no carboxyl groups such as methyl acrylate, ethyl acrylate, propyl acrylate, butyl acrylate, octyl acrylate, decyl acrylate, lauryl acrylate, methyl methacrylate, ethyl methacrylate, butyl methacrylate, heptyl methacrylate, decyl methacrylate, propyl crotonate, butyl crotonate, nonyl crotonate, and the like. Still further, one could use such copolymerizable compounds as styrene, ortho-, meta- or para-alkyl styrenes such as o-, m- or p-methyl, ethyl, propyl and butyl styrenes, 2,4-dimethyl styrene, 2,3-dimethyl styrene, 2,5-dimethyl styrene, vinyl naphthenate, acrylonitrile, methacrylonitrile, halo ring or side chain styrenes such as $\alpha$-chloro styrene, ortho-, meta- or para-chloro styrenes, 2,4-dichloro styrene, 2,3-dichloro styrene 2,5-dichloro styrene or the alkyl side chain styrenes such as $\alpha$-methyl styrene, $\alpha$-ethyl styrene, and the like. Additionally, one can make use of such polymerizable vinyl monomers as acrylamide, methacrylamide, ethacrylamide, ethylenebisacrylamide, N-tertiary-butylacrylamide, and the like.

The anionic polymeric materials containing alcoholic hydroxyl groups may be prepared by using a polymerizable vinyl monomer which contains an alcoholic hydroxyl group such as the hydroxy alkyl esters of $\alpha, \beta$-unsaturated monocarboxylic acids e.g. the hydroxy alkyl esters of acrylic acid, methacrylic, ethacrylic and chloro as well as the other chloro substituted acrylic acids. These esters may either have a primary or a secondary hydroxyl group. Illustrative of the types of compounds that are used to make the copolymers in the anionic, polymeric material are 2-hydroxy-ethyl acrylate, 2-hydroxypropyl acrylate, 3-hydroxy-propyl acrylate, 2-hydroxy-butyl acrylate, 3-hydroxy-butyl acrylate, 4-hydroxy-butyl acrylate, 8-hydroxy-octyl acrylate, 2-hydroxy-ethyl methacrylate, 5-hydroxyhexylmethacrylate, 6-hydroxy-octylmethacrylate, 8-hydroxy-octylmethacrylate, 10-hydroxy-decylmethacrylate, 3-hydroxy-propyl crotonate, 4-hydroxy-amyl crotonate, 5-hydroxyamyl crotonate, 6-hydroxy-hexyl crotonate, 7-hydroxy-heptyl crotonate, 10-hydroxydecyl crotonate, and the like. These hydroxy esters may be used either singly, in combination with one another or with other polymerizable vinyl monomers devoid of any alcoholic hydroxyl group including those set forth hereinabove in the discussion of the carboxyl group-containing monomers. Additionally, one can make use of other hydroxyl-containing polymerizable vinyl monomers such as methylolacrylamide, methlolmethacrylamide, and the like.

Among the amide group-containing monomers which may be used in the preparation of the anionic, water dispersible, polymeric material used in the present invention are acrylamide, methacrylamide, ethacrylamide, and the like. These polymerizable acrylamides may be used to prepare anionic copolymeric materials useful in the present invention with any of the carboxyl group-containing monomers of the hydroxyl group-containing monomers or with any of the copolymerizable monomers set forth hereinabove.

Additionally, one can make use of polyester resin compositions which are water dispersible, non-gelled, anionic polymeric materials. Water soluble alkyd resins or water dispersible alkyd resins, whether oil free or glyceride oil-containing may be used and a plurality of these materials are commercially available and are also well known in the art. As a consequence, it is not deemed necessary to make any prolonged recitation of such materials since they are fundamentally prepared by reacting a polyhydric alcohol with a polycarboxylic acid or with anhydrides such as phthalic anhydride, maleic anhydride, and the like.

Additionally, one can make use of epoxy esters as the anionic polymeric material in which the epoxy resins, which contain a plurality of hydroxyl groups, are reacted with glyceride oil fatty acids and then further reacted with maleic anhydride to yield a dispersion in an alkaline medium. Still further, one can make use of polyamides which are prepared by reacting alkylene polyamides with excess dicarboxylic acids to produce water soluble and water dispersible, anionic, polymeric materials.

A variety of emulsion anionic polymers may be used in the composition of the present invention, wherein the utilization of a variety of anionic surfactants or emulsifiers such as soaps and alkyl sulfonates are used to impart a charge characteristic to the emulsion particles which will result in the migration of such particles in electric fields. These same surfactants and in combination with a variety of nonionic surfactants can be used to post-emulsify a variety of epoxy esters, saturated and unsaturated alkyd resins and acrylic resins to prepare charged emulsion particles.

In order to illustrate the preparation of an anionic carboxyl group-containing polymer, the following example is set forth in which all parts are parts, by weight, unless otherwise indicated.

EXAMPLE 4

Preparation of Water-Soluble Polyester Resin

A maleinized tall oil-styrene-allyl alcohol copolymer was prepared by charging 1600 parts of a styrene-allyl-alcohol copolymer sold as "RJ-100" by the Monsanto Company, 1430 parts of a low rosin tall oil fatty acid and 150 parts xylene into a suitable reactor and heating the mixture slowly to 250°C. Remove water by azeotropic distillation with xylene. The reaction vessel is held at 250°C. until the acid number decreases to 10. The reaction mixture is cooled to 150°C. Thereafter, there are charged 190 parts of maleic anhydride and heated to 230°C. for 2½ hours. The reaction is cooled and diluted with 2-butoxy ethanol to 80% solids.

EXAMPLE 5

Carboxyl Group-Containing Polymer

Into a suitable reaction vessel equipped with stirrer, thermometer and reflux condenser, there are introduced 100 parts of dioxane. The charge is heated gradually to the reflux temperature by heating on an oil bath. After the dioxane has reached reflux, a mixture of 750 parts of butyl acrylate, 150 parts of acrylic acid and 100 parts of a 1% solution of butyl mercaptan in butyl acrylate is introduced in relatively small increments over a 2 hour period. Concurrently but separately, over the same period of time, there are added 12.2 parts of cumene hydroperoxide. After the addition is completed, reflux is continued for about 5 hours. 200 Parts of the copolymer thus prepared are dissolved in 220 parts of a mixture of 1 part of concentrated ammonia (29% $NH_3$) to 4 parts of water. An additional 80 parts of water are added to give an aqueous solution of 36% solids concentration of the copolymer. The solvent dioxane is used in the present example in an amount approximately 10% of the total charge. At the end of the polymerization reaction, this solvent may be stripped off under vacuum but it is preferred to leave said solvent in since its removal is not economically justifiable and since this solvent is completely water miscible.

EXAMPLE 6

An Alcoholic Hydroxyl Group-Containing Emulsion Anionic Polymer

Into a suitable reaction vessel equipped with a thermometer, stirrer, condenser, and two addition funnels, there are added 440 parts of deionized water, 3.4 parts of sodium bicarbonate, and 2.0 parts of sodium lauryl sulfate. The mixture is heated to about 90°C. whereupon a catalyst solution containing 2.25 parts of ammonium persulfate dissolved in 110 parts of deionized water is prepared and 12 parts of this solution are added to the reaction vessel. This is followed by the addition of 90 parts of said catalyst solution uniformly over a two hour period in comparatively small increments to the reaction vessel. Concurrently, but separately, a monomer mixture of 170 parts of styrene, 235.6 parts of ethyl acrylate, 4.5 parts of acrylic acid and 32 parts of hydroxyethyl methacrylate is added uniformly over the same two hour period through a separate funnel. The remainder of the catalyst solution is then added to the reaction vessel and the mixture is heated to 90°C. for an additional one hour period. The reaction mixture thus prepared was analyzed and was shown to have a polymer solids of 48%.

EXAMPLE 7

Amide-Containing Emulsion Anionic Polymer

Into a suitable reaction vessel equipped with a thermometer, stirrer, condenser, and two addition funnels, there are introduced 348 parts of deionized water, 1.85 parts of sodium lauryl sulfate, and 4.08 parts of sodium bicarbonate. The reaction mixture is heated to 90°C. whereupon a catalyst solution containing 2.7 parts of ammonium persulfate in 115 parts of deionized water is prepared and 12 parts of this catalyst solution are introduced into the reaction vessel. Thereupon, 90 parts of said catalyst solution are added uniformly in comparatively small increments over a 2 hour period to the reaction vessel. Concurrently during said 2 hour period, but separately, there is added a monomer mixture of 212 parts of styrene, 293 parts of ethyl acrylate, 5.3 parts of acrylic acid, 21 parts of acrylamide, 0.75 part of sodium lauryl sulfate and 348 parts of deionized water over this same two hour period. The remainder of the catalyst solution is then added to the reaction vessel and the mixture is heated to 90°C. for an additional one hour period. The reaction mixture thus prepared was analyzed and revealed a polymer solids of 37.6%.

The cationic water dispersible non-gelled polymeric materials used in the composition of the present invention may be any one of a plurality of polymeric materials which have reactive sites that are heat reactive with the guanamine compounds used in the composition of the present invention. As in the anionic materials, these reactive sites may be either carboxyl groups and/or alcoholic hydroxyl groups and/or amide groups, which polymeric materials may be the result of vinyl polymerization. Therefore, all of the polymerizable monomers in each of these three principal classes may be used to prepare the cationic polymeric materials used in the present invention. Still further, these polymerizable monomers may be used with other polymerizable monomers such as the esters, styrenes, nitriles, and the like, all of which have been set forth hereinabove, in significant detail in the discussion of the constitution of the anionic polymeric materials. The guanamine compounds used in the composition of the present invention exhibit good migration characteristics with a wide variety of cationic polymeric materials. These cationic polymeric materials can be broadly described as being selected from any one of the following classes: acrylic polymers, of which a substantial variety are vinyl and acrylic monomers and can be copolymerized with amino acrylates and methacrylates such ad dimethylaminoethyl methacrylate, diethylaminoethyl methacrylate and diethylaminoethyl acrylate, and the like. These polymers can be dissolved or dispersed in water with the addition of a water dispersible acid such as hydrochloric acid, acetic acid, and the like. It must be kept in mind that these polymers should also contain some —OH and/or —COOH and/or

groups which can be obtained by copolymerizing vinyl monomers with comparatively small amounts of such polymerizable monomers as hydroxyethyl methacrylate and/or acrylic acid or acrylamide. In this same broad classification, the amino methacrylates may be replaced by methylvinyl pyridine, and the like. Polymers containing this type of amino monomer can also be water dispersed by the addition of such water dispersible acids such as hydrochloric and acetic acids. The formation of the quaternary amine salt results in the water solubility or water dispersibility.

Another illustrative class of water dispersible, non-gelled polymeric materials carrying a cationic charge, which material is heat reactive with the guanamine compounds, are the reaction products of polyfunctional epoxy compounds (such as the reaction product of isopropylidine-4,4'-bis-phenol with epichlorohydrin) which are then reacted with a polyfunctional amine such as diethylenetriamine, ethylene diamine, iminobispropylamine and the like to yield cationic polymers which can be water dispersed or dissolved upon addition of various water dispersible acids such as hydrochloric or acetic acids. The adjustment of the charged mole ratio of amino to epoxy compound will control the amount of hydroxy groups that will be available for cross-linking with the guanamine compound will control the amount of hydroxy groups that will be available for cross-linking with the guanamine compounds.

Another class of water dispersible, non-gelled polymeric material carrying cationic charges which are heat reactive with the guanamine or melamine compounds used in the present invention are those prepared by reacting dibasic or tribasic organic acids with polyfunctional amines and with polyols which result in cationic polymers if sufficient polyfunctional amine is used in the initial charge. These polymers will be water soluble or dispersible with the addition of the aforementioned water dispersible acids and the formation of quaternary salts. These cationic polymers will also contain some free hydroxyl and/or carboxyl groups depending on the initial charge. A plurality of such water dispersible acidified polymers are prepared by the condensation of dimer acids with polyfunctional amines wherein the dimer acids are prepared by dimerizing a long chain fatty acid containing ethylenic unsaturation thereby providing a substance which results in the formation of a bridged long chain fatty dicarboxylic acid.

Another class of water dispersible, non-gelled polymeric materials which carry a cationic charge and which are heat reactive with the guanamine or melamine compounds used in the present invention are the cationic urea-formaldehyde resins. These condensation products are prepared by reacting urea and formaldehyde with polyfunctional amines to produce cationic resins which are water dispersible upon the addition of a water dispersible acid such as hydrochloric acid or acetic acid. These polymers are cationic and will move to the cathode in an electric field. Still further, these cationic polymers will have free methylol groups available for said reactive cross-linking with the guanamine compounds used in the composition of the present invention.

A further category of water dispersible, non-gelled, polymeric materials which carry a cationic charge and which materials are heat reactive with the guanamine compounds of the present invention are the polyethyleneimines. These polymeric materials are classical cationic polymers when treated with water dispersible acids in an aqueous system. This category of cationic polymers can be provided with reactive alcoholic hydroxyl groups simply by reacting with polyethyleneimine with controlled amounts of ethylene oxide. This modified cationic polymers will then move in the electric field and can be heat reacted with the guanamine compound during the curing reaction.

The following example illustrates a process for preparing a water soluble, cationic, epoxy amine resin.

EXAMPLE 8

Water-Soluble Cationic Epoxy Amine Resin

A mixture of 400 parts of a resinous reaction product prepared by reacting 4,4'-dihydroxydiphenyldimethylmethane with epichlorohydrin (having an epoxide average equivalency of 487) and 156 parts of tetraethylene pentamine are introduced into 400 parts of toluene at room temperature and then heated to reflux. After refluxing for 1 hour, the toluene and the unreacted tetraethylene pentamine are removed by distillation under reduced pressure finishing at about 175°C. and 3.5 mm./mercury pressure. An aqueous solution containing 30% of this resin is obtained by neutralizing the resin with an equivalent amount of dilute acetic acid and has a viscosity of 0.5 poise (Gardner-Holdt) at 25°C.

In the water dispersible, non-gelled, polymeric material carrying either a cationic or anionic charge, the amount of carboxyl groups and/or alcoholic hydroxyl groups and/or amide groups should be at least about 3%, by weight, based on the total weight of the polymeric material and not greater than about 30%, by weight, based on the total weight of the polymeric material. Preferably, one would use between about 5% to about 20%, by weight, based on the total weight of the polymeric material of the carboxyl-containing monomer and/or the alcoholic hydroxy-containing monomer or the amide-containing monomer. These percentages, by weight, prevail whether the individual monomer-containing carboxyl groups, alcoholic hydroxyl groups or amide groups are the sole reactive groups present or whether they are present in any of the above combinations.

It is also within the scope of the present invention to incorporate various additives into our novel compositions. For example, various dyes or pigments, such as $TiO_2$ or $Fe_2O_3$, can be added so that the coating which results from the electrodeposition process will be colored.

As before, these examples are set forth primarily for the purpose of illustration and any specific enumeration of detail contained therein should not be interpreted as a limitation on the case except as is indicated in the appended claims. All parts and percentages are by weight unless otherwise indicated.

EXAMPLE 9

77 Parts of 75% solution of water soluble polyester resin as prepared in Example 4 above, comprising a maleinized tall oil-styrene-allyl alcohol copolymer with an acid number of 70, dissolved in 2-butoxyethanol, 19 parts of a cross-linking agent as prepared in Example 1 above, 2.6 parts diethylamine and 23 parts of titanium dioxide rutile pigment were blended and ground on a three roll mill and emulsified in 870 parts of deionized water.

A film was electrodeposited at ambient temperatures at a potential difference of 100 volts for 1 minute on a zinc-phosphated cold rolled steel substrate and after rinsing with water, baked at 400°F. for 20 minutes. After exposure to a 1% detergent solution at 165°F. for 150 hours, the film prepared was virtually unaffected. Its color also remains unchanged for a period of six months, while the di(methoxymethyl) di(ethoxymethyl)benzoguanamine-containing films were strongly blistered and lost intercoat adhesion.

COMPARATIVE EXAMPLE 10

The procedure of Example 9 is repeated in every detail except that the unreacted, unresinified benzoguanamine compound, namely, the di(methoxymethyl)di(ethoxymethyl)benzoguanamine was used. The resultant film strongly blistered and lost intercoat adhesion.

EXAMPLE 11

The procedure of Example 9 is repeated in every detail except that the resinified cross-linking agent as prepared in Example 2 above is employed. The film so prepared is unaffected by the detergent treatment and further shows little discoloration during baking.

COMPARATIVE EXAMPLE 12

Example 9 is repeated in every detail except the cross-linking agent used was the condensation product of hexakismethoxymethyl melamine and resorcinol prepared in accordance with the disclosure of U.S. Pat. No. 3,449,228. Baked films gave hard films with excellent detergent resistance, but were yellow in color.

EXAMPLE 13

390 Parts of hexa(methoxymethyl) melamine, 150 parts of 2-phenoxy propanol and 2 parts of p-toluenesulfonic acid are slowly heated to 150°C. The reaction is stopped after 40 parts of distillate have been collected. The pale yellow product has a viscosity of 350 poises at a 95.8% solids.

EXAMPLE 14

67 Parts of an 75% acrylic resin solution prepared by the copolymerization of 275 parts of butylacrylate, 133 parts of styrene, 75 parts of acrylic acid in n-hexyl cellosolve is blended with 21.5 parts of the cross-linking agent in Example 13, 28.5 part of titanium dioxide rutile and 4.1 parts of diisopropanolamine. The resulting blend is ground on a three roll mill and emulsified in 880 parts of deionized water.

Resultant paint is electrodeposited at a voltage of 250–300 volts for 1 minute on zinc phosphated steel and baked for 20 minutes at 400°F. The prepared panels are white and pass 72 hour test in a detergent bath (ASTM-D2248).

Comparative panels prepared with hexa(methoxymethyl) melamine, are white in color but fail in the detergent test after 24 hours. Similarly, comparative panels prepared by using as the cross-linking agent, the reaction product of hexakismethoxymethyl melamine and resorcinol as prepared in accordance with U.S. Pat. No. 3,449,228, exhibit highly yellow films which pass a 72 hour detergent test (ASTM-D2248).

When the compositions of the present invention are used to deposit electrically the coatings of the present invention on electroconductive metallic articles, the compositions may be diluted with water to concentrations varying between about 3% and 30% and, preferably, between about 7% and 15% total resins solids.

I claim:

1. In an electrophoretic coating composition comprising, in aqueous dispersion, a mixture of from about 5% to about 40%, by weight, of (A) an aminoplast condensation product and, correspondingly, from about 95% to about 60%, by weight, of (B) a water-dispersible, non-gelled, polymeric material carrying an ionic charge, which polymeric material contains at least one class of reactive groups selected from the group consisting of carboxyl groups, alcoholic hydroxy groups and amide groups, said ionic charge is derived from the polymeric material containing said reactive groups wherein the amount of said groups is at least about 2%, by weight, and not more than about 30%, by weight, based on the total weight of said polymeric material, wherein said groups are heat reactive with (A), and wherein said percentages of (A) and (B), by weight, total 100% and are based on the total solids weight of (A) and (B); the improvement comprising, as said condensation product, the heat reaction product prepared by reacting at a temperature of at least 100°C in an acidic medium from about 90% to about 30% of a substantially water-insoluble, substantially fully etherified, substantially fully methylolated guanamine or substantially fully etherified, substantially fully methylolated melamine and from about 10% to about 70% of alkylated phenolic compound having the formula:

$$R-O-C_nH_{2n}+O-C_nH_{2n}+_mOH$$

wherein R is an aryl radical, $m$ is an integer from 0 to 3, and $n$ is an integer from 2 to 4.

2. In an electrophoretic coating composition according to claim 1 wherein the fully etherified tetramethylol guanamine is di(methoxymethyl) di-(ethoxymethyl)-benzoquanamine and the alkylated phenol is 2-(nonylphenoxy) ethanol.

3. In an electrocoating composition according to claim 1, wherein the fully etherified hexamethylol melamine is hexa(butoxymethyl) melamine and the alkylated phenol is 2-(nonylphenoxy) ethanol.

4. The composition according to claim 1 in which the composition as an aqueous dispersion is alkaline and in which the water dispersible, non-gelled, polymeric material carries an anionic charge.

5. The composition according to claim 4 in which said anionic, polymeric material contains carboxyl groups.

6. The composition according to claim 4 in which said anionic, polymeric material contains hydroxyl groups.

7. The composition according to claim 4 in which said anionic, polymeric material contains amide groups.

* * * * *